United States Patent
Faul et al.

[11] Patent Number: 5,336,722
[45] Date of Patent: Aug. 9, 1994

[54] POLYMERIC REACTION PRODUCTS

[75] Inventors: Dieter Faul, Bad Duerkheim; Gerhard Hoffmann, Otterstadt; Klaus Huemke, Friedelsheim; Ulrich Heimann, Muenster, all of Fed. Rep. of Germany; John A. Gilbert, Beverly Hills, Mich.

[73] Assignee: BASF Lacke+Farben Aktiengesellschaft, Muenster, Fed. Rep. of Germany

[21] Appl. No.: 979,313

[22] Filed: Nov. 20, 1992

[51] Int. Cl.$^5$ ............................ C08J 3/24; C08L 63/10
[52] U.S. Cl. ................................. 525/113; 528/405
[58] Field of Search ..................... 523/413; 525/113; 528/405

[56] References Cited

U.S. PATENT DOCUMENTS

| 4,432,850 | 2/1984 | Moriarity et al. | 204/181.6 |
| 4,532,299 | 7/1985 | Seneker | 525/530 |
| 4,804,581 | 2/1989 | Geary et al. | 525/113 |
| 5,051,160 | 9/1991 | Schwerzel et al. | 204/181.4 |

FOREIGN PATENT DOCUMENTS

| 2049167 | 8/1991 | Canada . |
| 381347 | 1/1990 | European Pat. Off. . |
| 385300 | 2/1990 | European Pat. Off. . |
| 432923 | 6/1991 | European Pat. Off. . |

*Primary Examiner*—Melvyn I. Marquis
*Assistant Examiner*—D. Aylward
*Attorney, Agent, or Firm*—Keil & Weinkauf

[57] ABSTRACT

Polymeric reaction products are obtained by reacting
I) prepolymers obtained from
  A) polyoxyalkylenes which have an average molecular weight $\overline{M}_n$ of from 140 to 10,000 and contain on average from 1.5 to 3.0
    a$_1$) primary or secondary amino groups or
    a$_2$) epoxy groups per molecule and
  B) polymers which are based on conjugated dienes, have an average molecular weight $\overline{M}_n$ of from 250 to 50,000 and contain on average from 1.5 to 3.0
    b$_1$) primary or secondary amino groups or
    b$_2$) epoxy groups per molecule, the components (a$_1$) and (b$_2$) or (a$_2$) and (b$_1$) being reacted with one another so that from at least an amino equivalent excess to 3 amino equivalents of component (a$_1$) or (b$_1$) are present per epoxide equivalent of component (a$_2$) or (b$_2$), with
II) at least one compound which forms free radicals.

7 Claims, No Drawings

POLYMERIC REACTION PRODUCTS

The present invention relates to polymeric reaction products which are obtainable by reacting I) prepolymers obtainable from
A) polyoxyalkylenes which have an average molecular weight $\overline{M}_n$ of from 140 to 10,000 and contain on average from 1.5 to 3.0
   a₁) primary and/or secondary amino groups or
   a₂) epoxy groups per molecule and
B) polymers which are based on conjugated dienes, have an average molecular weight $\overline{M}_n$ of from 250 to 50,000 and contain on average from 1.5 to 3.0
   b₁) primary and/or secondary amino groups or
   b₂) epoxy groups per molecule, the components (a₁) and (b₂) or (a₂) and (b₁) being reacted with one another so that from 1.05 to 3.0 amino equivalents of the component (a₁) or (b₁) are present per epoxide equivalent of the component (a₂) or (b₂), and
II) at least one compound which forms free radicals when energy is supplied.

The present invention furthermore relates to processes for the preparation of these polymeric reaction products and to the use of them in electrocoating baths.

Particularly in the automotive industry, the cathodic electrocoating process is being more and more frequently used for coating metal parts. Synthetic resins capable of cathodic deposition which protect the coated particles from corrosion are required. At the same time, the coatings obtained should be flexible so that they are not damaged by impacts. Moreover, even after they have dried or cured, the coatings should adequately cover edges so that these exposed parts do not corrode.

Reaction products of epoxy-containing polymers and amino-containing copolymers based on butadiene and acrylonitrile are described in EP-A2-385 300. EP-A-475 228 discloses synthetic resins which are obtainable by reacting amino-containing polyoxyalkylenes and polymers based on conjugated dienes. Although cured coatings which contain such resins have good mechanical properties, they do not adequately cover edges. Their corrosion protection is therefore unsatisfactory.

EP-A1-381 347 describes mixtures of an aqueous dispersion of a cationic resin with dispersed crosslinked microgel particles. The microgel particles can be obtained by reacting polymers which have amino, thio or active methylene groups with polymers which have α,β-unsaturated carbonyl functions. The coatings prepared from these mixtures provide better corrosion protection for edges but are not impact-resistant.

It is an object of the present invention to provide systems from which it is possible to produce coatings which are impact-resistant and at the same time have not only general corrosion resistance but in particular very good corrosion protection at edges.

We have found that this object is achieved by the reaction products defined at the outset.

These polymeric reaction products are obtainable by reacting prepolymers (I) with at least one compound (II) which forms free radicals. In general from 0.1 to 20, preferably from 0.5 to 10, in particular from 1 to 5, % by weight, based on the solids content of the prepolymers (I), of component (II) are used.

The prepolymers (I) are obtainable from polyoxyalkylenes (A) and polymers based on conjugated dienes (B).

Suitable components (A) are polyoxyalkylene derivatives which have an average molecular weight $\overline{M}_n$ of from 140 to 10,000, preferably from 300 to 6,000, particularly preferably from 350 to 2,000. The polyoxyalkylene derivatives have on average from 1.5 to 3.0, preferably from 1.8 to 2.2, primary and/or secondary amino groups (component (a₁)) or from 1.5 to 3.0, preferably 2, epoxy groups (component (a₂)) per molecule.

These polyoxyalkylene derivatives may be linear or branched. Polyoxyalkylene derivatives which contain different oxyalkylene groups in the chain are also suitable. Compounds whose alkylene moiety is of 1 to 12 carbon atoms are suitable polyoxyalkylene derivatives. The preparation of such amino- or epoxy-carrying polyoxyalkylenes is generally known and starts, for example, from the polymerization of ethylene oxide, propylene oxide, tetrahydrofuran or other cyclic ethers. The hydroxyl-containing polyoxyalkylenes thus obtained can then be converted into an amino-containing polyoxyalkylene (a₁), for example by Michael addition of acrylonitrile with subsequent hydrogenation of the nitrile group or by direct reaction with ammonia. The epoxy-containing polyoxyalkylenes (a₂) can be prepared, for example, by partial or complete epoxidation of the hydroxyl-carrying polyoxyalkylenes.

Particularly preferred amino-carrying polyoxyalkylenes (a₁) are those which have unsubstituted methylene groups α to a primary amino group, such as bis-(2-aminoethyl)-polyethylene oxide, bis-(3-aminopropyl)-polypropylene oxide or preferably bis-(2-aminoethyl)-polybutylene oxide or bis-(3-aminopropyl)-polybutylene oxide.

The preferred epoxy-carrying polyoxyalkylenes (a₂) include polyoxyethylene epoxides, polyoxypropylene epoxides and in particular polyoxybutylene epoxides.

Suitable components (B) are polymers which are based on conjugated dishes, have an average molecular weight $\overline{M}_n$ of from 250 to 50,000 and contain on average from 1.5 to 3.0, in particular from 1.8 to 2.2, primary and/or secondary amino groups (component (b₁)) or epoxy groups (component (b₂)) per molecule. Preferred polymers (B) have an average molecular weight $\overline{M}_n$ of from 1,000 to 10,000. Polymers having an average molecular weight of from 2,000 to 6,000 are very particularly preferred.

Such polymers based on conjugated dienes can be obtained under generally known conditions by free radical polymerization. Examples of suitable diene monomers are isoprene or butadiene, butadiene being preferred.

Depending on the type of comonomer, the amount of comonomer may be in general up to 45% by weight, based on the total weight of monomers, and is such that the glass transition temperature of the resulting copolymer is from −70° to −30° C.

Butadiene/acrylonitrile copolymers having an acrylonitrile content of from 5 to 45% by weight are preferred, an acrylonitrile content of from 10 to 30% by weight being particularly preferred.

The amino- or epoxide-carrying polymers can be prepared, for example, starting from carboxyl-functionalized polymers, for example based on butadiene, such as carboxyl-containing butadiene/acrylonitrile copolymers. It is known that the carboxyl groups can be introduced into the polymer, for example, by using a carboxyl-containing free radical initiator, such as carboxylated azoisobutyronitrile, in the polymerization.

The amino-containing polymers (b₁) can then be obtained, for example, by reacting the carboxyl-functionalized polymers with diamines. For example, amino-containing butadiene/acrylonitrile copolymers are widely available commercially.

Amino-carrying polymers (b₁) can also be prepared by partial hydrogenation of butadiene/acrylonitrile copolymers or by subjecting primary amines to an addition reaction with epoxy-containing butadiene/acrylonitrile copolymers.

The carboxyl-functionalized polymers can be converted into the corresponding epoxy-containing polymers (b₂) by reaction with polyglycidyl ethers which contain on average from 1.5 to 3.0 epoxy groups, diglycidyl ethers being preferred.

Examples of suitable polyglycidyl ethers are the diglycidyl ethers of aliphatic $C_2$–$C_{18}$-diols, such as ethylene glycol, propylene glycol, butanediol, pentanediol or hexanediol, or polyglycidyl ethers of mononuclear or polynuclear aromatic compounds containing at least two phenolic hydroxyl groups, for example hydroquinone, 2,2-bis-(4-hydroxyphenyl)-propane (bisphenol A), bis-(4-hydroxyphenyl)-methane (bisphenol F), 4,4'-dihydroxybenzophenone, 4,4'-dihydroxybenzosulfone or 1,5-dihydroxynaphthalene.

Such glycidyl ethers can be prepared in general by etherification with an epihalohydrin in an alkaline medium.

In addition, the epoxy-containing polymers (b₂) can also be prepared by first reacting the carboxyl-functionalized polymers with ethylene oxide. The hydroxyl-containing polymers thus obtained can then be epoxy-modified, for example by reaction with an epihalohydrin in an alkaline medium.

According to the invention, the prepolymers (I) are obtained by reaction of component (a₁) and component (b₂) or of component (a₂) with component (b₁). The amounts of the components are such that from 1.05 to 3.0, preferably from 1.3 to 2.3, amino equivalents of the component (a₁) or (b₁) are present per epoxide equivalent of component (a²) or (b₂).

The reaction of the polyoxyalkylenes (a₁) or (a₂) with the polymers based on conjugated dishes (b₂) or (b₁) to give the prepolymers (I) is carried out, as a rule, by a method in which each of the two components is reacted, at from 20° to 150° C., preferably from 50° to 110° C., in an organic solvent or solvent mixture which is inert to both amino and epoxy groups. Examples of suitable solvents are toluene, xylene, benzene, methyl isobutyl ketone and tetrahydrofuran. The preferred solvent is toluene.

The reaction time may be from 1 to 16 hours, the end point of the reaction being reached when the epoxide value is virtually zero, which can be readily determined in specific cases.

The reaction is usually carried out at atmospheric pressure.

The prepolymers (I) thus obtained generally have amine numbers of from 10 to 100, preferably from 20 to 60, mg of KOH/g of test substance.

The average molecular weights ($\overline{M}_n$) of the prepolymers (I) may be from about 500 to 150,000.

For further reaction, the prepolymers (I) may be freed from organic solvent or may be used in solution, the latter being preferred.

According to the invention, component (II) is a compound which forms free radicals when energy is supplied, or a mixture of different free radical donors of this type. Compounds which produce free radicals under thermal load are particularly suitable.

Examples of suitable components (II) are organic peroxides, such as di-tert-butyl peroxide, dicumyl peroxide, tert-butyl perbenzoate, tert-butyl peroctoate, lauryl peroxide or tert-butyl perpivalate, or azo compounds, such as azobisisobutyronitrile. Elemental sulfur, sulfur donors, such as dimorpholyl disulfide, 2-morpholinodithiobenzothiazole, dipentamethylenethiuram tetrasulfide, caprolactamdisulfide, N-oxydiethylenethiocarbmyl-N'-oxydiethylenesulfenamide or tetraethylthiuram disulfide, and mixtures of elemental sulfur, sulfur donors and organozinc compounds are also suitable.

Organic peroxides, including tert-butyl perbenzoate, tert-butyl peroctoate, tert-butyl perpivalate and lauroyl peroxide, are particularly preferably used. A further preferred compound which may be used as component (II) is azobisisobutyronitrile.

In the reaction of components (I) and (II), as a rule from 0.1 to 20, preferably from 0.5 to 10, in particular from 1 to 5, % by weight, based on the solids content of (I), of the free radical donor (II) are used.

As a rule, the reaction of the prepolymers (I) with component (II) is carried out by one of the methods (M1) to (M3) below.

Method (M1)

The components (I) and (II) are mixed in an organic solvent or solvent mixture which is inert toward amino groups and are then reacted at from about 20° to about 150° C., preferably from about 60° to about 130° C. The reaction time is in general more than 0.5 hour and less than 20 hours. Some or all of the amino groups of the novel polymeric reaction product are then neutralized with an acid, and the protonated product is dispersed with water. It is also possible to add the polymeric reaction product to a water/acid mixture and then to carry out dispersion. The organic solvents can subsequently be distilled off azeotropically. The novel polymeric reaction product thus obtained can then, for example, be mixed with other synthetic resins or added to an electrocoating bath, the latter being preferred.

Method (M2)

The components (I) and (II) in an organic solvent or solvent mixture are mixed and some or all of the amino groups are neutralized with an acid. The protonated mixture is then dispersed with water. However, it is also possible to add the mixture of (I) and (II) to a water/acid mixture and then to carry out dispersion. The aqueous dispersion is heated to from about 40° to about 100° C. over a period of, as a rule, more than 0.5 hour to about 5 hours. The organic solvents can subsequently be distilled off azeotropically. The novel polymeric reaction product thus obtained can then, for example, be mixed with other synthetic resins or added to an electro-coating bath, the latter being preferred.

Method (M3)

The components (I) and (II) in an organic solvent or solvent mixture are mixed and are dispersed as described under (M2). The organic solvents can subsequently be distilled off azeotropically. The aqueous dispersion obtained is subsequently used as such. For example, it may be added to an electrocoating bath, the reaction of components (I) and (II) taking place only during thermal treatment of the deposited coating.

The organic solvents which may be used in the reactions described above include benzene, toluene, xylene, sec-butanol, n-butanol and in particular isobutanol.

Suitable acids are inorganic acids, such as phosphoric acid, but preferably organic acids, including formic acid, acetic acid, propionic acid and lactic acid. Acetic acid and lactic acid are preferably used. Mixtures of different acids of this type may also be employed.

The particularly preferred method for reacting (I) with (II) is method (M2).

The aqueous dispersions obtained by method (M1), (M2) or (M3) have, as a rule, a solids content of from 15 to 40% and can, as stated above, be added to electrocoating baths.

The aqueous dispersions are used in amounts of from 5 to 30, preferably from 8 to 20, % by weight, based on the polymer content of the electrocoating bath.

Suitable electrocoating baths contain, as base resins, basic polymers which carry primary, secondary or tertiary amino groups as basic groups. It is also possible to use base resins which carry phosphonium or sulfonium groups. As a rule, these base resins additionally contain other functional groups, for example hydroxyl groups, or double bonds.

Suitable base resins of this type whose molecular weight is preferably from 2,000 to 200,000 are, for example, aminoacrylate and aminomethacrylate resins, polyadducts, such as aminopolyurethane resins, and polycondensates, such as aminoepoxy resins.

For primer coats having good corrosion protection properties, aminoepoxy resins are preferably used as base resins. Aminoepoxy resins are described in, for example, EP-A 134 983, EP-A 165 556, EP-A 167 029, DE-A 34 22 457 or DE-A 34 44 410.

They are obtained in a conventional manner by reacting epoxy-containing resins with saturated and/or unsaturated primary and/or secondary amines or amino alcohols. Suitable epoxy resins are compounds having on average from 1.5 to 3, preferably 2, epoxy groups per molecule and average molecular weights of from 300 to 6,000. Glycidyl ethers of polyphenols containing on average 2 hydroxyl groups in the molecule are particularly suitable, 2,2-bis-(4-hydroxyphenyl)-propane (bisphenol A) being a particularly suitable phenol component.

Epoxy resins having a higher molecular weight are obtained by reacting the abovementioned diglycidyl ethers with a polyphenol, such as 2,2-bis-(4-hydroxyphenyl)-propane, and further reacting the resulting products with epichlorohydrin to give polyglycidyl ethers.

The aminoepoxy resin can also be modified with saturated or unsaturated polycarboxylic acids, for example with adipic acid, fumaric acid or a dimeric fatty acid.

It is also possible to use base resins which have additionally been reacted with half-blocked isocyanates and have self-crosslinking properties. Such resins are described in, for example, EP-A-273 247 or U.S. Pat. No. 4,692,503.

If the base resins carry no self-crosslinking groups, a crosslinking agent must be added prior to dispersing.

Suitable crosslinking agents for these base resins are, for example, urea condensates as described in DE-A 33 11 514 or phenolic Mannich bases according to DE-A 34 22 457. EP-A 134 983 also mentions blocked isocyanates or aminoplast resins, such as urea/formaldehyde resins, melamine resins or benzoguanamine resins, as further possible crosslinking agents.

The electrocoating baths may furthermore contain pigment pastes and conventional assistants. The pigment pastes are obtainable, for example, from grinding resins and pigments, such as titanium dioxide, carbon black or aluminum silicates, and assistants and dispersants. Suitable grinding resins are described in, for example, EP-A 107 089 or EP-A 251 772.

The coating films in cathodic electrocoating are usually deposited at 20°–35° C., preferably 25°–32° C., in the course of 5–500, preferably 60–300, sec at deposition voltages of 50–500 V. The article to be coated is made the cathode.

The coating films are then bakable at 120°–210° C., preferably 140°–180° C.

According to investigations under the electron microscope, the cathodically deposited coatings have a two-phase structure, the novel polymeric reaction products forming domains within the loading matrix. The size of these domains is in general from 50 nm to 2 μm.

EXAMPLES

1. Preparation of the prepolymers ($I_1$) and ($I_2$)

Prepolymer ($I_1$)

Component ($b_1$) used was a butadiene/acrylonitrile copolymer which had an average molecular weight $\overline{M}_n$ of 3,500 and an amine number of 64 mg of KOH/g of solid substance and was prepared by reacting 2-aminoethylpiperazine with a carboxyl-terminated butadiene/acrylonitrile copolymer having an acrylonitrile content of 16% by weight.

1,519 g of component ($b_1$) were dissolved in 772 g of toluene with constant stirring, and 282 g of a polyoxybutylene diglycidyl ether ($a_2$) having an epoxide equivalent weight of about 420 were added. Stirring was then carried out for 5 hours at 100° C., the end point of the reaction being indicated by an epoxide value of virtually zero. The product ($I_1$) thus obtained had an amine number of 54.8 mg of KOH/g of solid substance. The prepolymer ($I_1$) was diluted with 428.9 g of isobutanol and was used in the form of this solution as described under 2.

Prepolymer ($I_2$)

An epoxy-carrying butadiene/acrylonitrile copolymer was used as component ($b_2$). For its preparation, 203 g of a carboxyl-terminated butadiene/acrylonitrile copolymer having an average molecular weight $\overline{M}_n$ of 3,600 and an acrylonitrile content of 17% by weight were mixed with 376 g of a bisphenol A diglycidyl ether having an epoxide equivalent weight of about 190, while stirring. Stirring was then continued for 5.5 hours at 130° C., the end point of the reaction being reached at an acid number of <1 mg of KOH/g of solid substance.

533.3 g of component ($b_2$) were dissolved in 302 g of toluene, and 170.4 g of a bis-(3-aminopropyl)-polyoxybutylene ($a_1$) having an average molecular weight $\overline{M}_n$ of 750 were added while stirring. Stirring was then continued for 7 hours at 100° C., the end point of the reaction being indicated by an epoxide value of virtually zero. The product ($I_2$) thus obtained had an amine number of 35 mg of KOH/g of solid substance and was further used as described under 2.

2. Preparation of the novel aqueous dispersions (D1)–(D12)

Method (M1)

Dispersion (D1)

416.66 g of the solution of the prepolymer ($I_1$) were diluted with 83.34 g of isobutanol and mixed with 5.0 g of tert-butyl perbenzoate while stirring. The mixture was stirred for 1 hour at 75° C. The novel polymeric reaction product ($P_1$) had an amine number of 55 mg of KOH/g of solid substance.

The resulting solution of ($P_1$) in isobutanol was neutralized with 8.3 g of acetic acid and then dispersed at 40° C. with 750 g of deminersalized water. Thereafter, the organic solvent was distilled off azeotropically as far as possible and at the same time deminersalized water was added in an amount such that the resulting dispersion (D1) had a solids content of 25%.

Dispersion (D2)

357.1 g of the solution of the prepolymer ($I_2$) were diluted with 59.5 g of isobutanol, and 5 g of tert-butyl peroctoate were added with constant stirring. The mixture was stirred for 9 hours at 80° C. During this time, a further 5 g of tert-butyl peroctoate were added a little at a time. The novel polymeric reaction product ($P_2$) had an amine number of 35 mg of KOH/g of solid substance.

The resulting solution of ($P_2$) in isobutanol was neutralized with 6.0 g of acetic acid and then dispersed at 40° C. with 583 g of deminersalized water. Thereafter, the organic solvent was distilled off azeotropically as far as possible under reduced pressure and at the same time deminersalized water was added in an amount such that the resulting dispersion (D2) had a solids content of 29%.

Method (M2)

General procedure for the preparation of dispersions (D3)–(D6)

The solutions of the prepolymers ($I_1$) and ($I_2$) were mixed, in the amounts stated in Table 2, with tert-butyl peroctoate as component (II), neutralized with acetic acid and then codispersed at 40° C. with the stated amount of demineralized water. Thereafter, the organic solvent was distilled off azeotropically under reduced pressure as far as possible and at the same time the solids content of the particular dispersion was adjusted by adding deminersalized water. The dispersions thus obtained were heated at 90° C. for the time stated in Table 1.

TABLE 1

| Dispersion | D3 | D4 | D5 | D6 |
|---|---|---|---|---|
| Amount of prepolymer solution [g] | $I_1$ 500 | $I_1$ 500 | $I_1$ 500 | $I_2$ 700 |
| Amount of free radical donor (II) [g] | 7.5 | 5.0 | 2.5 | 12.25 |
| Acetic acid [g] | 8.8 | 8.8 | 8.8 | 10.4 |
| Water [g] | 750 | 750 | 750 | 1260 |
| Reaction time [h] | 3 | 2 | 2 | 2.5 |
| Solids content [% by wt.] | 23.5 | 23.5 | 23.5 | 27.1 |

Method (M3)

General procedure for the preparation of dispersions (D7)–(D12)

The solutions of the prepolymers ($I_1$) and ($I_2$) were mixed, in the amounts stated in Table 2, with the corresponding component (II) stated in the Table, neutralized with acetic acid and then codispersed with the stated amount of deminersalized water. Thereafter, the organic solvent was distilled off azeotropically as far as possible and at the same time the solids content of the particular dispersion was adjusted by adding deminersalized water.

TABLE 2

| Dispersion | D7 | D8 | D9 | D10 | D11 | D12 |
|---|---|---|---|---|---|---|
| Amount [g] | A1 342.8 | A2 285.7 | A1 342.8 | A1 500 | A1 333.3 | A2 400 |
| Free radical initiator (III) [g] | [1] ... | [1] ... | [2] 4.0 | [3] 7.5 | [4] 4.0 | [4] 4.0 |
| Acetic acid [g] | 5.95 | 3.5 | 5.9 | 7.48 | 5.77 | 4.56 |
| Water [g] | 600 | 514 | 600 | 700 | 600 | 400 |
| Solids content [% by weight] | 29.9 | 31.8 | 24.5 | 29.0 | 30.1 | 26.9 |

[1] Sulfur formulation: 3.4 g of elemental sulfur, 0.6 g of dipentamethylenethiuram tetrasulfide and 1 g of zinc stearate
[2] Azobisisobutyronitrile
[3] tert-Butyl perbenzoate
[4] tert-Butyl peroctoate

3. Comparative dispersions (VD1) and (VD2)

For comparison, the prepolymers ($I_1$) and ($I_2$) were dispersed in the absence of component (II) and the dispersions thus obtained were added to electrocoating baths.

Comparative dispersion (VD1)

1,200 g of the solution of the prepolymer ($I_1$) were neutralized with 2 1.2 g of acetic acid and then dispersed at 40° C. with 2,160 g of deminersalized water. Thereafter, the organic solvent was distilled off azeotropically under reduced pressure as far as possible and at the same time deminersalized water was added in amounts such that the resulting dispersion (VD1) had a solids content of 22.9%.

Comparative dispersion (VD2)

785.7 g of the solution of the prepolymer ($I_2$) were neutralized with 11.7 g of acetic acid and then dispersed at 40° C. with 1,414 g of deminersalized water. Thereafter, the organic solvent was distilled off azeotropically under reduced pressure as far as possible and at the same time demineralized water was added in an amount such that the resulting dispersion (VD2) had a solids content of 29.8%.

4. Electrocoating baths

Preparation of the electrocoating bath components

Preparation of the base resin

A mixture of 5,800 g of hexamethylenediamine, 7,250 g of a dimeric fatty acid and 1,400 g of linoleic acid was heated slowly to 195° C., the water formed (540 g) being distilled off. Thereafter, the mixture was cooled to 100° C. and diluted to a solids content of 70% by weight with 5,961 g of toluene. The intermediate had an amine number of 197 mg of KOH/g of substance.

In a second stirred vessel, 10 equivalents of a diglycidyl ether based on bisphenol A and epichlorohydrin and having an equivalent weight of 485 were dissolved in a solvent mixture of 1,039 g of toluene and 1,039 g of isobutanol with heating. The solution thus formed was cooled to 60° C. and 300.4 g of methylethanolamine and 128 g of isobutanol were added, the temperature increasing to 78° C. in the course of 5 minutes. Thereafter, 1,850 g of the intermediate were added, the mixture was heated at 80° C. for 2 hours and the base resin was obtained in this manner.

Preparation of the pigment paste 168.7 g of butylglycol, 600 g of water and 16.5 g of acetic acid were added to 525.8 g of the base resin. Thereafter, 800 g of titanium dioxide, 11 g of carbon black and 50 g of basic lead silicate were added and the mixture was milled in a ball mill to a particle size of less than 9 µm. The solids content was then brought to 47% by weight with water.

Preparation of the crosslinking agent

A mixture of 1.32 kg of toluene, 0.42 kg of methylolpropane and 0.72 kg of bisphenol A was stirred at 60° C. until a homogeneous solution had formed. This solution was added to a mixture of 3.45 kg of isophorone diisocyanate, 0.86 kg of toluene and 0.0034 kg of dibutylin dilaurate, which mixture had been heated to 60° C. The mixture was kept at 60° C. for 2 hours and 2.0 kg of dibutylamine were then added, the rate of addition being adjusted so that the temperature of the reaction mixture did not exceed 80° C. 1.11 kg of toluene were then added and the mixture was kept at 80° C. for a further hour.

4.2 Preparation of the electrocoating baths E1 to E12 and (V0) to (V2)

General method 700 g of the base resin and 300 g of the crosslinking agent were dispersed, with the addition of 19 g of acetic acid, with an amount of water such that a dispersion having a solids content of 31% by weight was obtained. Thereafter, organic solvents were distilled off azeotropically and the solids content was then brought to 35% by weight with water.

The resulting dispersion of base resin and crosslinking agent (B.-C.-Disp.) was mixed with 775 g of the pigment paste and varying amounts of the novel dispersions (D1) to (D12) or the comparative dispersions (VD1) or (VD2) and brought to a volume of 5,000 ml with water.

The electrocoating baths were stirred for 168 hours at 30° C. Coating films were deposited in the course of 120 seconds on zinc-phosphatized steel test panels which had been made the cathode. These coating films were then baked for 20 minutes at 155° C. and served as primers for the production of three-coat systems for determining the stone chip resistance according to MBE (Mercedes-Benz single stone chip test).

The composition of the baths, the deposition conditions and the test results of the primers are listed in Table 3.

5. Production of three-coat systems for determining the stone chip resistance according to MBE First a filling coat and then a top coat were applied by spray application to the cathodically deposited primers obtained according to 4.2. For the filling coat, a filler based on polyestermelamine resin (e.g. filler FC 80–100 from BASF) was applied in a layer thickness of from 35 to 40 µm and baked for 25 minutes at 155° C.

For the top coat, a two-component high-solids top coat based on polyester-polyol isocyanate (e.g. top coat FD 730-0782 (2K-HS) from BASF) was used, said top coat being applied in a layer thickness of from 35 to 40 µm and baked for 30 minutes at 130° C.

The stone chip resistance according to MBE (Mercedes-Benz single stone chip test) was determined for the three-coat systems thus obtained. The results are listed in Table 3.

TABLE 3

Application tests

| Example (No.) according to the invention | B.-C.-Disp. [g] | Disp. [g] | Disp. (No.) | U [V] | CT [µm] | EC [mm] | RI [Nm] | MBE (-) [mm²/R] | SST [U$_w$/ER] |
|---|---|---|---|---|---|---|---|---|---|
| E1 | 1638 | 551 | (D1) | 400 | 20.2 | 9.9 | 6.8 | 2.5/0.5 | 1.0/2 |
| E2 | 1638 | 467 | (D2) | 400 | 23.9 | 7.9 | 3.4 | 3.3/3.0 | 0.75/0 |
| E3 | 1638 | 592 | (D3) | 380 | 22.5 | 8.0 | 6.8 | 4.5/1.0 | 1.0/0 |
| E4 | 1638 | 592 | (D4) | 380 | 21.4 | 9.3 | 15.8 | 5.0/1.0 | 0.95/0 |
| E5 | 1638 | 592 | (D5) | 400 | 20.5 | 8.2 | 10.2 | 4.0/1.0 | 1.1/0 |
| E6 | 1638 | 512 | (D6) | 400 | 22.9 | 10.0 | 13.6 | 3.0/1.0 | 1.1/0 |
| E7 | 1616 | 455 | (D7) | 360 | 21.5 | 6.8 | 2.8 | 3.0/0.0 | 1.6/4 |
| E8 | 1616 | 428 | (D8) | 360 | 25.4 | 9.7 | 11.3 | 3.0/1.5 | 1.5/4 |
| E9 | 1617 | 556 | (D9) | 400 | 28.2 | 7.7 | 7.9 | 3.5/1.0 | 1.0/4 |
| E10 | 1638 | 469 | (D10) | 400 | 22.5 | 7.9 | 6.8 | 4.0/1.0 | 0.75/1 |
| E11 | 1638 | 453 | (D11) | 400 | 24.6 | 8.4 | 6.8 | 2.7/1.0 | 0.75/3 |
| E12 | 1638 | 506 | (D12) | 390 | 25.6 | 8.7 | 6.8 | 5.5/0.0 | 0.9/3 |
| Z for comparison | | | | | | | | | |
| V0 | 1974 | — | (—) | 400 | 25.1 | 6.1 | 1.1 | 7.0/5.0 | 1.5/>5 |
| V1 | 1638 | 595 | (VD1) | 400 | 22.5 | 7.6 | 5.7 | 2.7/1.0 | 1.65/5 |
| V2 | 1638 | 457 | (VD2) | 390 | 24.1 | 9.8 | 11.3 | 4.0/2.0 | 1.65/5 |

U Deposition voltage
CT Coat thickness
EC Erichsen cupping
RI Reverse impact; determined using a mandrel impact tester from Gardner according to ASTM D 2794
SST 360 hour salt spray test on untreated sheet metal, U$_w$: Undermigration in mm according to DIN 50,021; ER: Degree of edge rusting in ratings 0 (no rust) to 5 (very severely rusted)
MBE Mercedes-Benz single stone chip test at a test temperature of −20° C.; DIN 55,995, method A; Erichsen Technical Description Model 490 (1981).

We claim:

1. A composition consisting essentially of polymeric reaction product which is obtained by reacting I) prepolymers obtained from A) polyoxyalkylenes which have an average molecular weight $\overline{M}_n$ of from 140 to 10,000 and contain on average from 1.5 to 3.0
  a₁) primary or secondary amino groups or
  a₂) epoxy groups per molecule and
B) polymers which are based on conjugated dienes, have an average molecular weight $\overline{M}_n$ of from 250 to 50,000 and contain on average from 1.5 to 3.0
  b₁) primary or secondary amino groups or
  b₂) epoxy groups per molecule, the components (a₁) and (b₂) or (a₂) and (b₁) being reacted with one another so that from at least an amino equivalent excess to 3 amino equivalents of component (a₁) or (b₁) are present per epoxide equivalent of component (a₂) or (b₂), with
II) at least one compound which forms free radicals.

2. A composition consisting essentially of polymeric reaction product as claimed in claim 1, obtained by reacting the prepolymer (I) with from 0.1 to 20% by weight, based on the solids content of the prepolymer (I), of at least one compound (II).

3. A composition consisting essentially of polymeric reaction product as claimed in claim 1, wherein the polyoxyalkylene (A) is a polyoxybutylene.

4. A composition consisting essentially of polymeric reaction product as claimed in claim 1, wherein the polymer (B) is a butadiene/acrylonitrile copolymer having an acrylonitrile content of from 5 to 45% by weight.

5. A composition consisting essentially of polymeric reaction product as claimed in claim 1, wherein the compound (II) is selected from the group consisting of azobisisobutyronitrile, tert-butyl perbenzoate, tert-butyl peroctoate, tert-butyl perpivalate and lauroyl peroxide.

6. A process for the preparation of a polymeric reaction product as claimed in claim 1, wherein
I) prepolymers obtained from
  A) polyoxyalkylenes which have an average molecular weight $\overline{M}_n$ of from 140 to 10,000 and contain on average from 1.5 to 3.0
    a₁) primary or secondary amino groups or
    a₂) epoxy groups per molecule, and
  B) polymers which are based on conjugated dienes, have an average molecular weight $\overline{M}_n$ of from 250 to 50,000 and contain on average from 1.5 to 3.0
    b₁) primary or secondary amino groups or
    b₂) epoxy groups per molecule, the components (a₁) and (b₂) or (a₂) and (b₁) being reacted with one another so that from at least an amino equivalent excess to 3 amino equivalents of component (a₁) or (b₁) are present per epoxide equivalent of component (a₂) or (b₂), are reacted with
II) at least one compound which forms free radicals when energy is supplied.

7. A process for the preparation of a polymeric reaction product as claimed in claim 1, wherein the prepolymer (I) is partially or completely neutralized with an acid, then dispersed together with the compound (II) and reacted at from 40° to 100° C.

* * * * *

UNITED STATES PATENT AND TRADEMARK OFFICE
CERTIFICATE OF CORRECTION

PATENT NO.: 5,336,722

DATED: August 9, 1994

INVENTOR(S): FAUL et al.

It is certified that error appears in the above-identified patent and that said Letters Patent is hereby corrected as shown below:

On the title page, add the following on the line after item [22]:

[30]       Foreign Application Priority Data
   Nov. 23, 1991   Fed. Rep. of Germany  P 41 38 586.1

Signed and Sealed this

Fifteenth Day of November, 1994

Attest:

BRUCE LEHMAN

*Attesting Officer*         *Commissioner of Patents and Trademarks*